United States Patent
Chaperon et al.

(10) Patent No.: US 12,403,627 B2
(45) Date of Patent: Sep. 2, 2025

(54) METHOD FOR CUTTING SUBSTRATE ELEMENTS

(71) Applicants: STMicroelectronics (Grenoble 2) SAS, Grenoble (FR); STMicroelectronics (Research & Development) Limited, Marlow (GB)

(72) Inventors: Melodie Chaperon, Grenoble (FR); William Halliday, Edinburgh (GB); Jean Gagnieux, Montaud (FR)

(73) Assignees: STMicroelectronics (Grenoble 2) SAS, Grenoble (FR); STMicroelectronics (Research & Development) Limited, Marlow (GB)

( * ) Notice: Subject to any disclaimer, the term of this patent is extended or adjusted under 35 U.S.C. 154(b) by 237 days.

(21) Appl. No.: 18/124,834

(22) Filed: Mar. 22, 2023

(65) Prior Publication Data
US 2023/0302683 A1    Sep. 28, 2023

(30) Foreign Application Priority Data

Mar. 23, 2022  (FR) ...................... 2202556

(51) Int. Cl.
*B28D 5/00* (2006.01)
*B28D 5/04* (2006.01)

(52) U.S. Cl.
CPC ......... *B28D 5/0082* (2013.01); *B28D 5/0052* (2013.01); *B28D 5/04* (2013.01)

(58) Field of Classification Search
CPC ....... B28D 5/0082; B28D 5/0052; B28D 5/04
See application file for complete search history.

(56) References Cited

U.S. PATENT DOCUMENTS

| 6,165,232 A | 12/2000 | Tieber et al. |
| 8,877,613 B2 * | 11/2014 | Munakata ............... H01L 24/97 438/464 |
| 2004/0010896 A1 | 1/2004 | Wright et al. |
| 2009/0277591 A1 * | 11/2009 | Zhao ................... G11B 5/3173 29/603.18 |

(Continued)

FOREIGN PATENT DOCUMENTS

| CN | 104416685 A | 3/2015 |
| CN | 106163725 A | 11/2016 |

(Continued)

OTHER PUBLICATIONS

INPI Search Report and Written Opinion for priority application, FR 2202556, report dated Nov. 3, 2022, 12 pgs.

(Continued)

*Primary Examiner* — Sean M Michalski
(74) *Attorney, Agent, or Firm* — Crowe & Dunlevy LLC

(57) ABSTRACT

In a method, substrate elements are provided wherein each substrate element has a first side and a second side meeting at a corner point. The substrate elements are picked and then placed on a support device in alignment. A cutting operation is then performed where each of the substrates elements are cut along a cut line having a common first direction which intersects the first and second sides of each of the substrate elements in order to create a third side on each substrate element. The third side of each of the substrate elements meets the first and the second sides at corresponding corner points.

22 Claims, 4 Drawing Sheets

(56) References Cited

U.S. PATENT DOCUMENTS

| | | | | |
|---|---|---|---|---|
| 2010/0004608 A1* | 1/2010 | Hamamoto | ......... | B29C 67/0048 |
| | | | | 264/138 |
| 2019/0362960 A1 | 11/2019 | Seddon et al. | | |
| 2019/0389091 A1* | 12/2019 | Chen | ................ | H01L 21/67028 |
| 2020/0070285 A1 | 3/2020 | Kang et al. | | |
| 2022/0184768 A1* | 6/2022 | Okamura | ............. | B28D 5/0082 |
| 2023/0302683 A1* | 9/2023 | Chaperon | ............ | B28D 5/0082 |
| 2024/0181573 A1* | 6/2024 | Chainur | ................ | B23K 26/10 |

FOREIGN PATENT DOCUMENTS

| | | | |
|---|---|---|---|
| EP | 2168742 A1 | 3/2010 | |
| JP | 2012161888 A | 8/2012 | |
| JP | 2018142572 A | 9/2018 | |
| TW | 200908112 A | 2/2009 | |
| WO | 2006025622 A1 | 3/2006 | |
| WO | 2007096483 A2 | 8/2007 | |
| WO | 2010086865 A1 | 8/2010 | |

OTHER PUBLICATIONS

CN First Office Action and Search Report for counterpart CN Appl. No. 202310289148.0, report dated Jul. 3, 2025, 11 pgs.

\* cited by examiner

METHOD FOR CUTTING SUBSTRATE ELEMENTS

PRIORITY CLAIM

This application claims the priority benefit of French Application for Patent No. 2202556, filed on Mar. 23, 2022, the content of which is hereby incorporated by reference in its entirety to the maximum extent allowable by law.

TECHNICAL FIELD

The present disclosure relates generally to methods for cutting a substrate, for example a glass substrate or a semiconductor substrate or an optical substrate.

BACKGROUND

Cutting a substrate into rectangular substrate elements is relatively straight-forward, as cut lines can be made in perpendicular directions. However, cutting a substrate into substrate elements having other shapes, such as shapes having five or more sides, is more complex. Current methods for obtaining substrates elements having non-rectangular shapes use routing operations. However, such methods are time consuming and costly, and the precision obtained after routing is not always sufficient. Such methods also lack versatility in terms of the corner angles that can be obtained, and lead to relatively high quantities of wasted substrate area.

There is a need for a relatively quick method for obtaining substrate elements exhibiting non-rectangular shapes at relatively low cost and with a relatively high versatility.

There is a need to address all or some of the drawbacks of known methods.

SUMMARY

An embodiment provides a method comprising: providing substrate elements each having a first side and a second side meeting at a corner point; picking and placing the substrate elements to align them on a support device; cutting each of said substrates elements along a cut line having a common first direction and intersecting the first and second sides of each of the substrate elements in order to create a third side on each substrate element, the third side of each of the substrate elements meeting the first and the second sides at corresponding corner points.

According to an embodiment, during the picking and placing, said substrates elements are orientated such that the first sides of the substrate elements are parallel on the support device, and/or such that the second sides of the substrate elements are parallel on the support device.

According to an embodiment, cutting of said substrate elements is achieved along a second cut line having a second direction common to all substrates elements, different from or parallel to the first direction and intersecting the first and/or second sides and/or another side of each of the substrate elements.

According to an embodiment, the second direction is perpendicular to the first direction.

According to an embodiment, said support device is configured to maintain said substrate elements in place while cutting of the substrate elements takes place.

According to an embodiment, the substrate elements comprise glass or a photovoltaic material or a semiconductor material, for example, silicon, silicon carbide, germanium, an alloy of indium and gallium or sapphire.

According to an embodiment, the substrate elements have a fourth side, the first side or the second side meeting the fourth side at a further corner point; and after the third side of the substrate elements has been created, the substrate elements are picked and placed to be aligned, on the support device or on another support device; then another cutting of the substrate elements is achieved along a further cut line having a third direction common to all substrates elements and intersecting the first side or the second side and fourth side of each of the substrate elements in order to create at least a fifth side, for each of the substrate elements, meeting the first or the second side and the fourth side at corresponding corner points.

An embodiment provides a method comprising: cutting a substrate, arranged on a holding device, with a first cutting tool, into substrate elements each having a first and a second side meeting at a corner point; rotating the cutting tool and cutting the substrate elements, in order to create at least a third side, for each of the substrate elements, the third side meeting the first and the second sides at corresponding corner points.

According to an embodiment, cutting the substrate elements is realized along at least two parallel cut lines.

According to an embodiment, when cutting the substrate, a same cutting operation is realized twice in order to separate two adjacent substrate elements.

According to an embodiment, the substrate elements are arranged in columns with a gap between adjacent columns or in rows with a gap between adjacent rows.

According to an embodiment, the substrate elements each comprise a same arrangement of features, the arrangement of features being rotated by 180° between alternate substrate elements in a way that opposite corners are cut on alternate substrate elements.

According to an embodiment, at least one of the cutting steps is performed by sawing or by laser cutting.

According to an embodiment, the step of providing substrate elements comprises cutting a substrate, placed on an initial support, into the substrate elements.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a substrate as orientated during normal use.

Unless specified otherwise, the expressions "around", "approximately", "substantially" and "in the order of" signify within 10%, and preferably within 5%.

Figure 1:
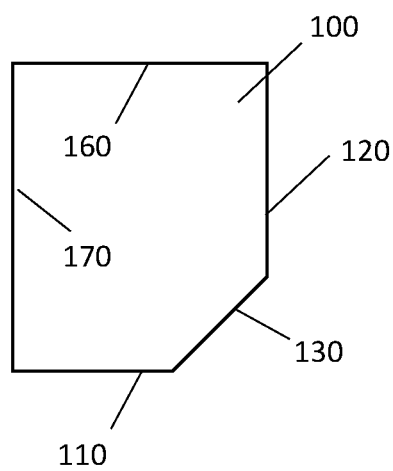
FIGS. 1, 2, and 3 are schematic top views of a substrate element according to example embodiments of the present disclosure.

FIG. 1 is a schematic top view of an example of a substrate element 100.

The substrate element 100 has a first side 110 and a second side 120, which are perpendicular to each other. Corresponding corner points of the first and second sides are linked by a third side 130, which corresponds to a cut corner of the substrate element 100. The substrate element 100 of FIG. 1 also comprises, for example, a fourth side 160 and a fifth side 170, which are, for example, perpendicular with each other and meet at a corner point diagonally opposite the third side 130.

Figure 2:
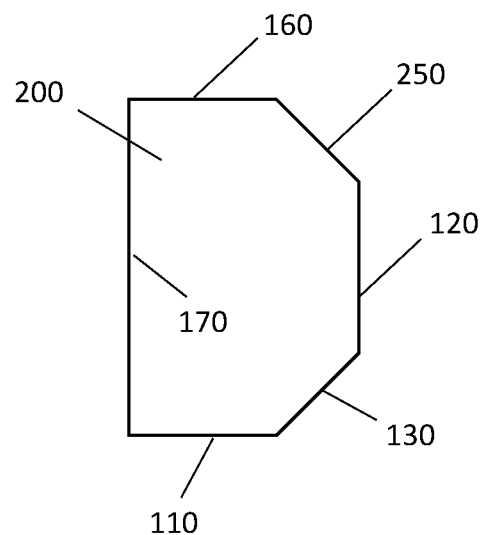

FIG. 2 is a schematic top view of an example of a substrate element 200. The substrate element 200 is similar to the substrate element 100 of FIG. 1, except that corresponding corner points of the second 120 and the fourth side 160 are linked by a sixth side 250, which corresponds to another cut corner of the substrate element 200.

Figure 3:
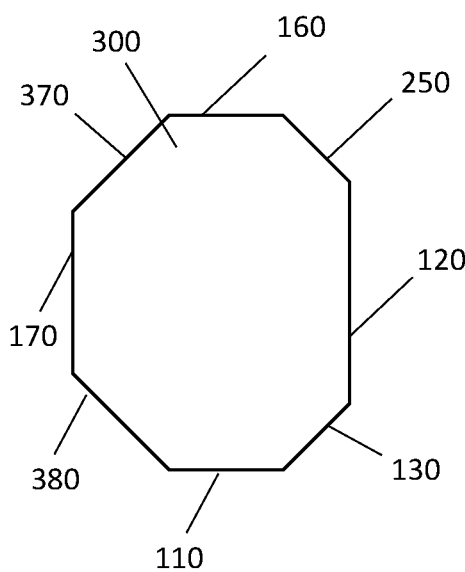

FIG. 3 is a schematic top view of an example of a substrate element 300. The substrate element 300 is similar to the substrate element 200 of FIG. 2 except that corresponding corner points of the first and fifth sides 110, 170 are linked by a seventh side 380, which corresponds to another cut corner of the substrate element 300. The substrate element 300 is also different from the substrate element 200 of FIG. 2 in that corresponding corner points of the fourth side 160 and the fifth side 170 are linked by an eighth side 370, which corresponds to another cut corner of the substrate element 300.

The substrate elements 100, 200, 300 are, for example, made of glass or a photovoltaic material or a semiconductor material, for example, silicon, silicon carbide, germanium, an alloy of indium and gallium or sapphire. The substrate elements 100, 200, 300 are, in another example, made of plastic such as PMMA (Polymethylmethacrylate) or polycarbonate or an optic grade plastic. In some embodiments, each of the substrate elements comprises an electronic circuit and/or an integrated circuit and/or an interconnection circuit. In some embodiments, each of the substrate elements comprises a ball grid array or an organic land grid array (OLGA).

While FIGS. 1, 2, and 3 illustrate having shapes corresponding to rectangular elements with respectively one, two and four cut corners, the method described in the present disclosure can be used to obtain substrate elements having different shapes with three or five or more cut corners.

Figure 4:
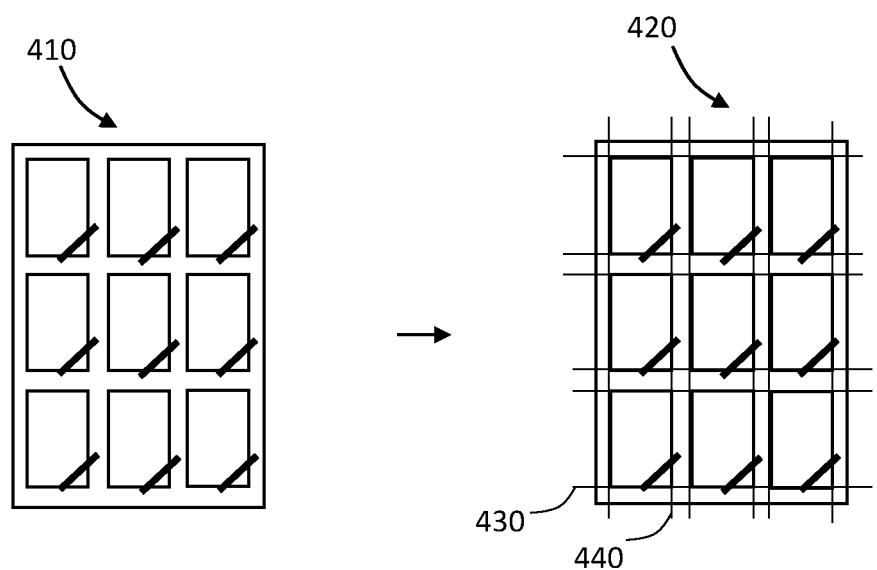
FIG. 4 illustrates a method of obtaining the substrate elements of FIG. 1 according to an example based on routing.

FIG. 4 illustrates a method of obtaining the substrate element of FIG. 1 according to an example based on routing.

In a step 410, an initial substrate is provided comprising nine rectangular substrate elements arranged in three rows and three columns, and a routing tool is used to cut a corner of each of the substrate elements comprised in the initial substrate. The routing tool is lifted between the routing of a corner of each substrate element which may result in additional production costs. A space is necessary between the adjacent columns and rows of substrate elements in order to allow the routing tool to complete the cut without cutting the substrate elements in the adjacent row and column. For example, it is assumed that the substrate elements on the initial substrate of this example are designed for routing with 800 μm gaps between adjacent substrate elements.

In a step 420, the individual substrate elements are cut using perpendicular cut lines 430, 440 along vertical and horizontal directions. In view of the gaps between the rows and columns of substrate elements, two horizontal cut lines 430 are made between adjacent rows of substrate elements, and two vertical cut lines 440 are made between adjacent columns of substrate elements.

The method of FIG. 4 is therefore relatively time consuming in view of the high number of cut lines, and there is a relatively high amount of wasted material between the rows and columns.

Figure 5:
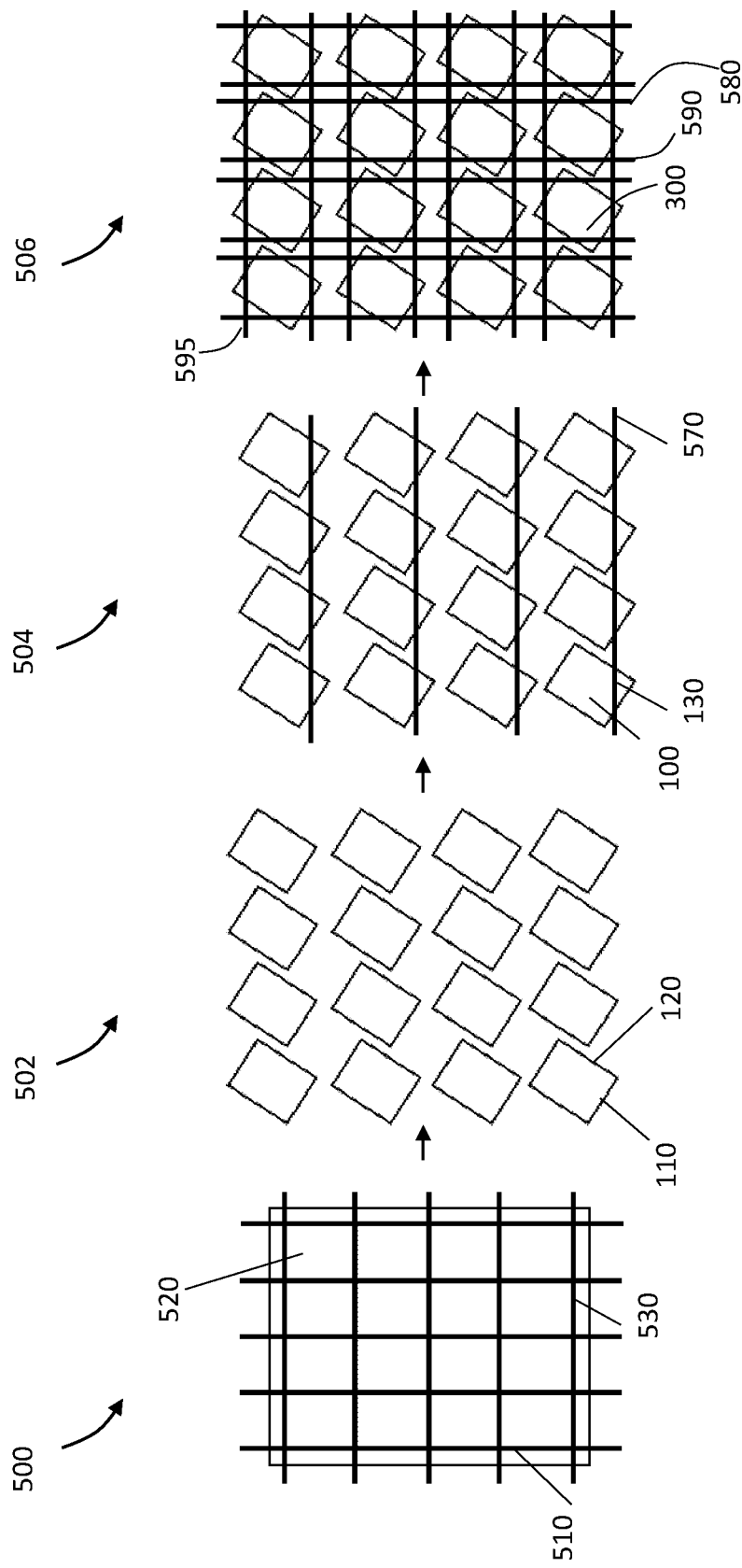
FIG. 5 illustrates a method of obtaining the substrate elements of FIG. 1, FIG. 2 and/or FIG. 3 according to an embodiment of the present disclosure.

FIG. 5 illustrates a method for obtaining the substrate elements of FIG. 1, FIG. 2 and/or FIG. 3 according to one embodiment of the present disclosure.

In a step 500, an initial substrate 520 placed on a first support is cut into several substrate elements similar to the substrate elements of FIG. 1 or FIG. 2 or FIG. 3 but with no cut corners. The cutting operation is, for example, performed by sawing or laser. Prior to the cutting operation, the initial substrate is, for example, fixed on a support with a tape. After the cutting operation, an ultraviolet treatment is, for example, applied to the tape in order to dissociate the substrate elements obtained by the cutting operation from the tape. The cutting operation consists, for example, in cutting along perpendicular cut lines 510, 530, which define, for example, substrate elements with a rectangular shape. In alternative embodiments, the cut lines 510, 530 are non-perpendicular. Furthermore, in some embodiments, the substrate elements are fabricated by another process, and provided already formed.

In a step 502, the substrate elements are picked and placed so as to be aligned on a second support device (not illustrated). The second support device is, for example, configured to hold the substrate elements in place. The second support device comprises, for example, a surface covered by a tape, and the substrate elements are held in place by the tape. The substrate elements are, for example, each orientated in accordance with one or more cut lines to used to make one or more corner cuts across the substrate elements. The substrate elements are, for example, placed so as to be parallel to each other such that the angle of each corner cut is the same. For example, the substrate elements are placed so that their first sides 110 are parallel and their second sides 120 are parallel. In the example of FIG. 5, the substrate elements are placed so as to be arranged in four parallel rows, each row having four parallel substrate elements.

In a step 504, the substrate elements of each row positioned at step 502 are cut along a corresponding cut line 570 having a common first direction for all of the substrate elements. Each cut line 570 intersects, for example, the first and second sides 110, 120 of each of the substrate elements in order to create the third side 130 on each substrate element. In the example of FIG. 5, since the substrate elements are arranged in four parallel rows, there are four similar parallel cut lines 570 having the common first direction. At the end of the step 504, the substrate elements have, for example, one cut corner, which is detached from the rest of the substrate element and is, for example, discarded.

The step 504 results, for example, in substrate elements similar to the substrate element 100 of FIG. 1. In order to obtain substrate elements similar to those of FIG. 2 or 3, a further step 506 is, for example, performed, in which the substrate elements obtained at step 504 are cut along additional cut lines, which are performed, for example, by sawing or by lasering along vertical cut lines 580 and/or along vertical cut lines 490. The vertical line 580, and/or the vertical cut line 590, is duplicated, for example, for each column of substrate elements. In the example of FIG. 5, the vertical cut lines 580 are arranged to cross the second and the fourth sides of each substrate elements of a column of substrate elements. In this example, the vertical cut lines 590 are arranged, for example, to cross the sixth and the first sides of each substrate elements of a column of substrate elements.

In an example of step 506, additional horizontal cut lines 595 are performed in order to cross the sixth sides and the fourth sides of each of the substrate elements of a same row. Similar horizontal lines 595 are, for example, performed for each row of substrate elements.

The additional cut lines performed in step 506 allow, for example, substrate elements similar to substrate elements 300 of FIG. 3 to be obtained.

In the case where each cut corner has a different angle and/or in order to obtain substrate elements having other shapes, it is possible, in some embodiments, as an alternative to the step 506, to repeat the steps 502 and 404. During the step 502 that is repeated, the substrate elements undergo a rotation when they are placed, such that they are orientated differently from their orientation in the first step 502. In this case, more than one cut corner may be created. For example, the substrates elements obtained in the example have two or three or four cut corners.

The method of FIG. 5 allows to increase the number of substrate elements obtained from an initial substrate compared to methods using routing, such as the method of FIG. 4. By using the method of FIG. 5, the initial substrate is, for example, designed with 250 µm sawing gaps between substrate elements, which leads to a reduction in the amount of wasted surface area compared to the example of FIG. 4. The overall cutting accuracy of the cut corners with the method of FIG. 5 is a function of the accuracy of the sawing machine, which is typically ±5 µm, combined with the blade thickness accuracy, which is typically of ±15 µm for the initial substrate cuts, and a Pick and Place accuracy, which is typically of ±10 µm. This overall accuracy of around ±30 µm is an improvement when compared to the routing accuracy of FIG. 4, which is of about ±100 µm.

Figure 6:
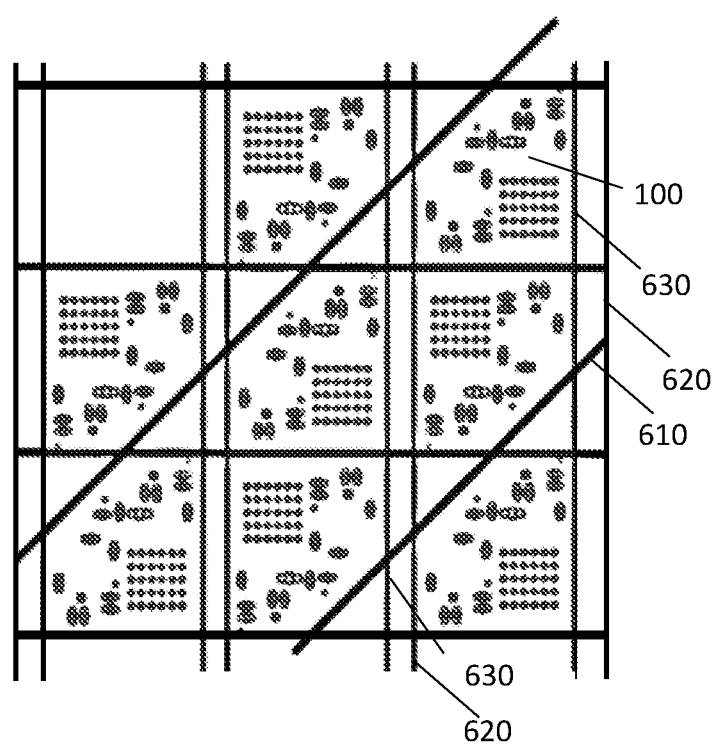
FIG. 6 illustrates a method of obtaining the substrate elements of FIG. 1, FIG. 2 and/or FIG. 3 according to another embodiment of the present disclosure.

FIG. 6 illustrates a method of obtaining the substrate elements of FIG. 1, FIG. 2 and/or FIG. 3 according to another embodiment of the present disclosure.

In the example of FIG. 6, the substrate elements to be obtained are arranged on the initial substrate with gaps between adjacent columns and not between adjacent rows. In another example (not illustrated), gaps are present between adjacent rows and not between adjacent columns.

In the example of FIG. 6, the substrate elements each comprise a same arrangement of features, the arrangement of features being rotated by 180° between alternate substrate elements in a way that opposite corners are cut on alternate substrate elements.

The method of FIG. 6 comprises a step of cutting the initial substrate, which is arranged on a holding device. Cutting the initial substrate is performed along cut lines 630, 620, which are, for example, perpendicular to each other, for example with a first cutting tool, to obtain a chipping of the substrate elements.

In another step of the method of FIG. 6, the cutting tool or the holding device is, for example, rotated with respect to the substrate, to cut the substrate elements along cut lines 610, in a way that at least the third side is created for each of the substrate elements. The cutting tool is, for example, a sawing tool or a laser.

In the method of FIG. 6, each substrate element is separated from the adjacent ones by two cut lines 620, 630, which are, for example parallel.

In the example of FIG. 6, since the substrates elements of same columns are rotated by 180°, opposite corners are cut on alternate substrate elements.

In the example of FIG. 6, the width of the gap between the columns determines the distance from the diagonal that the cut line crosses each element. Furthermore, the angle of the cut lines 630 with respect to the substrate elements is also a function of the width of the gap.

In an example, the method of FIG. 6 could be combined with the method of FIG. 5 by pick and place of the substrates elements in order to cut additional corners.

Various embodiments and variants have been described. Those skilled in the art will understand that certain features of these embodiments can be combined and other variants will readily occur to those skilled in the art. In particular, the substrate elements may have a non-rectangular shape prior to the corner cutting operation. For example, prior to the corner cutting operation, the substrate elements could have a polygon shape, such as a convex polygon shape, including but not limited to a triangular or parallelogram shape.

Finally, the practical implementation of the embodiments and variants described herein is within the capabilities of those skilled in the art based on the functional description provided hereinabove.

The invention claimed is:

1. A method, comprising:
providing a plurality of substrate elements, wherein each substrate element has a first side and a second side meeting at a corner point;
picking and placing the plurality of substrate elements on a support device to be aligned with each other; and
cutting each of the plurality of substrate elements along a first cut line having a first direction common to the plurality of substrate elements and intersecting the first and second sides of each substrate element in order to create a third side on each substrate element, wherein the third side of each substrate element meets the first and the second sides at corresponding corner points.

2. The method according to claim 1, wherein, during the picking and placing, said plurality of substrates elements are orientated such that the first sides of the substrate elements on the support device are parallel to each other.

3. The method according to claim 1, wherein, during the picking and placing, said plurality of substrates elements are orientated such that the second sides of the substrate elements on the support device are parallel to each other.

4. The method according to claim 1, further comprising cutting each of said substrate elements along a second cut line having a second direction common to the plurality of substrate elements.

5. The method according to claim 4, wherein the second direction is different from the first direction and configured to intersect only one of the first and second sides.

6. The method according to claim 4, wherein the second direction is different from the first direction and configured to intersect a side other than the first and second sides.

7. The method according to claim 4, wherein the second direction is perpendicular to the first direction and configured to intersect only one of the first and second sides.

8. The method according to claim 4, wherein the second direction is parallel to and offset from the first direction and configured to intersect a side other than the first and second sides.

9. The method according to claim 1, wherein said support device is configured to maintain said plurality of substrate elements in place while cutting of the plurality of substrate elements takes place.

10. The method according to claim 1, wherein each substrate element is made of a material selected from the group consisting of: a glass material, a photovoltaic material, a semiconductor material.

11. The method according to claim 10, wherein the semiconductor material is selected from the group consisting of: silicon, silicon carbide, germanium, an alloy of indium and gallium or sapphire.

12. The method according to claim 10, wherein each substrate element comprises one of a ball grid array or an organic land grid array.

13. The method according to claim 1, wherein each substrate element has a fourth side that meets with one of the first and second sides at a further corner point; and
further comprising, after cutting to create the third side:
picking and placing the plurality of substrate elements on a support device to be aligned with each other; and
cutting each of the plurality of substrates elements along a second cut line having a third direction common to the plurality of substrate elements and intersecting one of the first and second sides of each substrate element in order to create a fifth side on each substrate element, the fifth side of each substrate element meeting said one of the first and the second sides and the fourth side at corresponding corner points.

14. The method according to claim 1, wherein cutting comprises performing one of a sawing or a laser cutting.

15. The method according to claim 1, wherein providing the plurality of substrate elements comprises cutting a substrate, placed on an initial support, into the substrate elements.

16. A method, comprising:
cutting a substrate, arranged on a holding device, with a cutting tool into a plurality of substrate elements, wherein each substrate element has a first side and a second side meeting at a corner point;
rotating the cutting tool; and
then cutting the plurality of substrate elements to create at least a third side for each substrate element, the third side meeting the first and the second sides at corresponding corner points.

17. The method according to claim 16, wherein cutting the substrate is realized along at least two parallel cut lines.

18. The method according to claim 16, wherein cutting the substrate comprises performing a same cutting operation twice in order to separate two adjacent substrate elements.

19. The method according to claim 16, wherein the plurality of substrate elements are arranged in columns with a gap between adjacent columns.

20. The method according to claim 16, wherein the plurality of substrate elements are arranged in rows with a gap between adjacent rows.

21. The method according to claim 16, wherein each substrate element comprises a same arrangement of features, said same arrangement of features being rotated by 180° between alternate substrate elements in a way that opposite corners are cut on alternate substrate elements when cutting the plurality of substrate elements to create said third side.

22. The method according to claim 16, wherein at least one of cutting the substrate and cutting the plurality of substrate elements is performed by one of sawing or laser cutting.

* * * * *